US007969972B2

(12) United States Patent
Cordero et al.

(10) Patent No.: US 7,969,972 B2
(45) Date of Patent: Jun. 28, 2011

(54) SYSTEM FOR RECEIVING PACKET STREAM

(75) Inventors: Rodrigo Cordero, Bristol (GB); Paul Cox, Bristol (GB); Andrew Dellow, Bristol (GB)

(73) Assignee: STMicroelectronics (R&D) Ltd., Buckinghamshire (GB)

( * ) Notice: Subject to any disclaimer, the term of this patent is extended or adjusted under 35 U.S.C. 154(b) by 981 days.

(21) Appl. No.: 11/144,396

(22) Filed: Jun. 3, 2005

(65) Prior Publication Data
US 2005/0276264 A1 Dec. 15, 2005

(30) Foreign Application Priority Data

Jun. 3, 2004 (EP) .................................. 04253297

(51) Int. Cl.
*H04L 12/28* (2006.01)
(52) U.S. Cl. ....................................... 370/389
(58) Field of Classification Search .................. 348/564, 348/9, 14.07; 370/487, 535, 486, 389; 715/721
See application file for complete search history.

(56) References Cited

U.S. PATENT DOCUMENTS

| 5,600,366 | A | * | 2/1997 | Schulman ........................ 725/36 |
| 5,822,324 | A | * | 10/1998 | Kostresti et al. ............... 370/487 |
| 5,847,771 | A | * | 12/1998 | Cloutier et al. ............... 348/564 |
| 6,160,545 | A | * | 12/2000 | Eyer et al. ...................... 715/721 |
| 6,441,841 | B1 | * | 8/2002 | Tanoi .......................... 348/14.07 |
| 6,637,027 | B1 | | 10/2003 | Breslauer et al. |
| 2004/0017831 | A1 | * | 1/2004 | Shen et al. .................... 370/486 |
| 2005/0068992 | A1 | * | 3/2005 | Kaku et al. .................... 370/535 |

FOREIGN PATENT DOCUMENTS

| EP | 1 089 522 A2 | 4/2001 |
| EP | 1 152 607 A1 | 11/2001 |
| WO | WO 97/28499 A1 | 8/1997 |
| WO | WO 02/19249 A2 | 3/2002 |

OTHER PUBLICATIONS

European Search Report from corresponding European Application No. 04253297.8, filed Jun. 3, 2004.

* cited by examiner

*Primary Examiner* — Derrick W Ferris
*Assistant Examiner* — Gbemileke Onamuti
(74) *Attorney, Agent, or Firm* — Lisa K. Jorgenson; James H. Morris; Wolf, Greenfield & Sacks, P.C.

(57) ABSTRACT

A system including input circuitry for receiving from one of a plurality of sources at least one packet stream including a plurality of packets for providing audio, video, private data and/or associated information; at least one output for outputting at least one packet of the at least one packet stream to circuitry arranged to provide an output stream; wherein the system is arranged to provide a tag indicative of the source, the tag being associated with the at least one packet.

27 Claims, 8 Drawing Sheets

| Stream | Register Value | Address | Tag Byte |
|---|---|---|---|
| External 0 | 0x00 | NA | 0x00 |
| External 1 | 0x01 | | 0x01 |
| External m | 0x0F | | 0x0F |
| Software 0 | 0x10 | 0x00 | 0x10 |
| Software 1 | | 0x01 | 0x11 |
| Software n | | 0xEF | 0xFF |

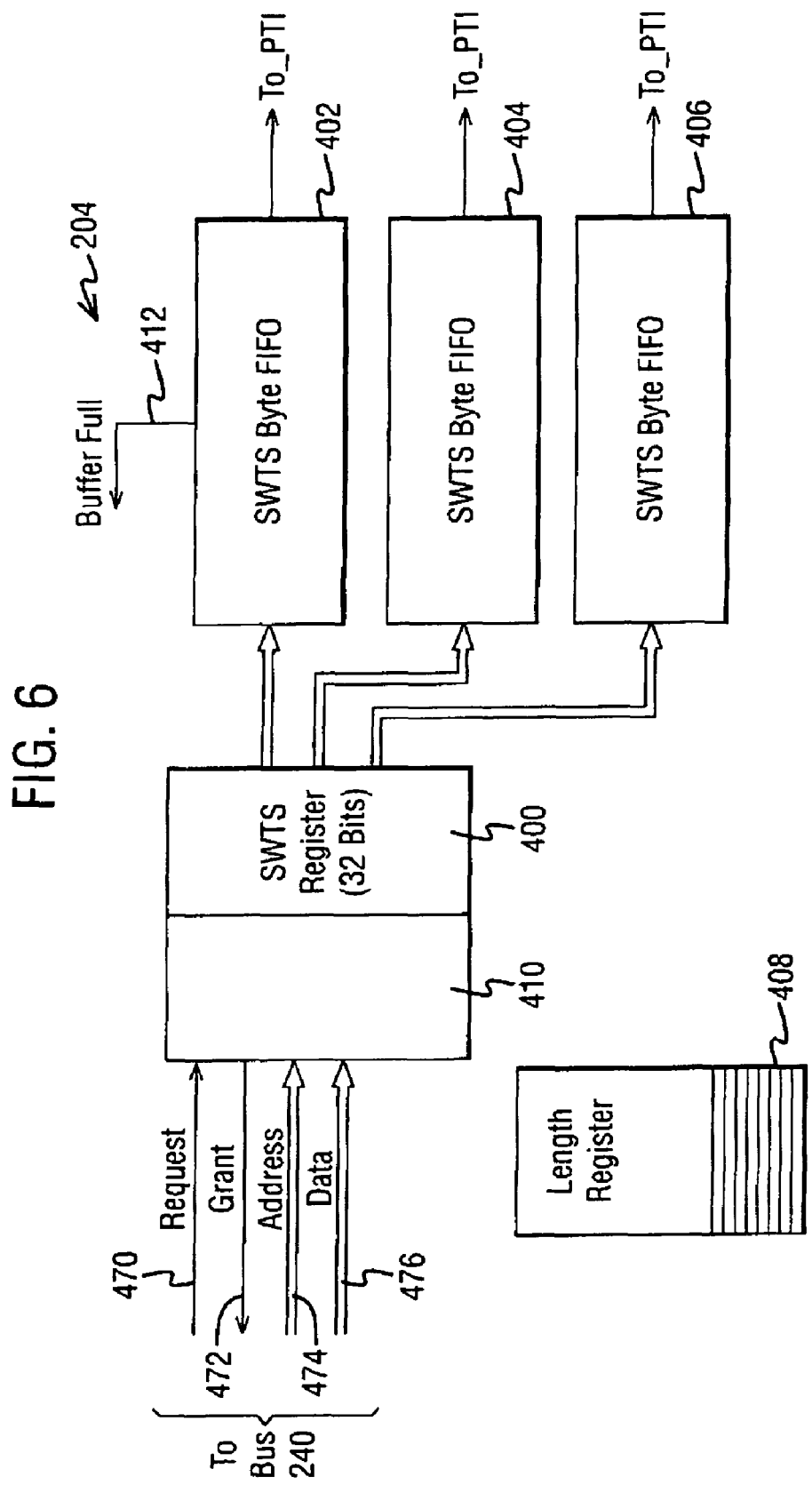

SYSTEM FOR RECEIVING PACKET STREAM

BACKGROUND OF THE INVENTION

1. Field of the Invention

The present invention relates to a system for receiving transport streams and, in particular, but not exclusively, to a system for use in a set top box.

2. Discussion of the Related Art

In digital television systems, the television is provided with a set top box to receive and decode a broadcast digital data stream which contains program information for display on the television. The broadcast digital data stream may arrive at the set top box via a satellite or cable system, via a digital terrestrial system, via the internet, or via disk or tape. A disk or tape, such as a CD ROM in a personal computer, may provide digital video information for display on the monitor.

There are various known standards for digital video broadcasting (DVB) and one now commonly used standard is the MPEG-2 standard (for example ISO/IEC 13818).

In the MPEG-2 DVB standard, video and audio information is encoded digitally according to MPEG2 and packetized into transport packets. Each transport packet, after encoding (for example using Viterbi and Reed-Solomon Channel coding) is defined by the standard as consisting of 188 bytes, (although other lengths are possible, E.g. DVB-H) comprising a minimum of four header bytes and a maximum of 184 payload bytes ("the data payload"). For transmission, the transport packets are time division multiplexed into a transport stream. At the receiver in the set top box, the transport stream is demultiplexed to recover the transport packets. Optionally, the transport packets may be scrambled and encoded with error correction information for transmission and then descrambled and error checked at the receiver. The payload in the transport packets is, according to the MPEG-2 standard, one of two types. The first type is known is a packetized elementary stream (PES), and the second type is known as program specific information (PSI).

The packetized elementary streams (PESs) form the video, audio and private data information of the broadcast. A PES packet may contain all sorts of data, audio or video and also other information such as teletext or other user defined general data. The MPEG-2 transport stream is made up of one or more PESs (either video, audio or private). The MPEG-2 transport stream is primarily intended for the transport of TV programs over long distances. This type of stream can combine, in the same multiplex, many programs, each of them being composed of one or more PESs. In order that the receiver can cope with this mix of program information, the MPEG-2 standard defines all types of tables, which together make up the MPEG-2 program specific information (PSI), which is information associated with the audio, video or private data of the PES.

At each decoder or set top box, the transport stream is decoded. To achieve the decoding of the transport stream, each set top box is provided with a transport interface, which provides an input interface between the transport stream input to the box and the actual MPEG-2 decoders which decode the audio and video information and sections broadcast. The transport interface demultiplexes the transport stream to retain only those transport packets, which are required by the particular set top box for decoding. The transport stream is a set of different services time division multiplexed and the purpose of the transport interface is to demultiplex them. At a front input end of the transport interface, a time demultiplex function is performed to separate the transport stream into its component transport packets.

Each transport packet has associated therewith in its header a packet identifier (PID) which identifies the type of packet and various information associated with the data in the packets including the type of packet (PES or PSI). Each particular receiver or set top box is only interested in receiving packets having packet identifiers of interest to the particular set top box, for instance those associated with the particular program selected for viewing. Thus, once the incoming transport stream has been time demultiplexed to recover the transport packets, it is necessary to further demultiplex the transport packets to retain only those having packet identifiers required by the receiver.

The transport interface merely uses the header of PES transport packets to demultiplex them, and stores the data payload (ES) of the demultiplexed packets in the memory. The transport interface similarly demultiplexes PSI transport packets but then filters the sections of the demultiplexed packets to retain only sections required by the receiver, before storing the filtered sections in the memory without further processing.

In modern systems one or more streams of MPEG data may be obtained from a memory instead of via a satellite or cable link. This data may or may not be in the form of a transport stream, but may be packets of data comprising audio, video, private and/or associated information. This data may be received from local memory, such as a hard disk, or from memory in a remote station via a network link. Depending on where a packet stream originates, the PID of a particular packet within that stream must be interpreted differently by the transport interface. For instance the same PID value might be present in a received packet which is part of a packet stream received via a satellite signal and a received packet which is part of a packet stream originating from a remote station via a network interface, however only packets from one of these streams may be required by the receiver. In another example the same PID value might be present in packets received in packet streams from different remote stations via the network interface, and likewise only the stream currently being viewed may be required by the receiver.

Known solutions to this problem provide multiple transport interfaces, a separate interface one for each packet stream, or multiple ports in a transport interface such that the origin of a particular stream is known. However, such solutions have a number of disadvantages, for example they are costly, and are inefficient in their use of hardware resources.

SUMMARY OF THE INVENTION

It is an aim of embodiments of the present invention to at least partially address these problems.

According to a first embodiment of the present invention a system is provided comprising at least one input means for receiving from one of a plurality of sources at least one packet stream comprising a plurality of packets for providing audio, video, private data and/or associated information, at least one output means for outputting at least one packet of said at least one packet stream to circuitry arranged to provide an output stream, wherein the system is arranged to provide a tag indicative of said source, said tag being associated with said at least one packet.

According to another embodiment of the present invention, a set top box comprising receiving means and a device is provided, said device comprising at least one input means for receiving from one of a plurality of sources at least one packet stream comprising a plurality of packets for providing audio, video, private data and/or associated information at least one output for outputting at least one packet of said at least one packet stream to circuitry arranged to provide an output stream, wherein the device is arranged to provide a tag indicative of said source, said tag being associated with said at least one packet. The receiving means and the device contained within this set top box could also be incorporated in a mobile station, multimedia system or a digital video player in alternative embodiments of the present invention.

According to a further aspect of the present invention a method of receiving a packet stream is provided, the method comprising the steps of receiving from one of a plurality of sources via at least one input means at least one packet stream comprising a plurality of packets for providing audio, video, private data and/or associated information, providing a tag indicative of said source, said tag being associated with at least one of said packets of said at least one packet stream, and outputting said at least one packet to circuitry arranged to provide an output stream.

BRIEF DESCRIPTION OF THE DRAWINGS

For a better understanding of the present invention and as to how the same may be carried into effect, reference will now be made by way of example only to the accompanying drawings in which:

FIG. 6 shows a software register according to an embodiment of the present invention;

DETAILED DESCRIPTION

Figure 1:
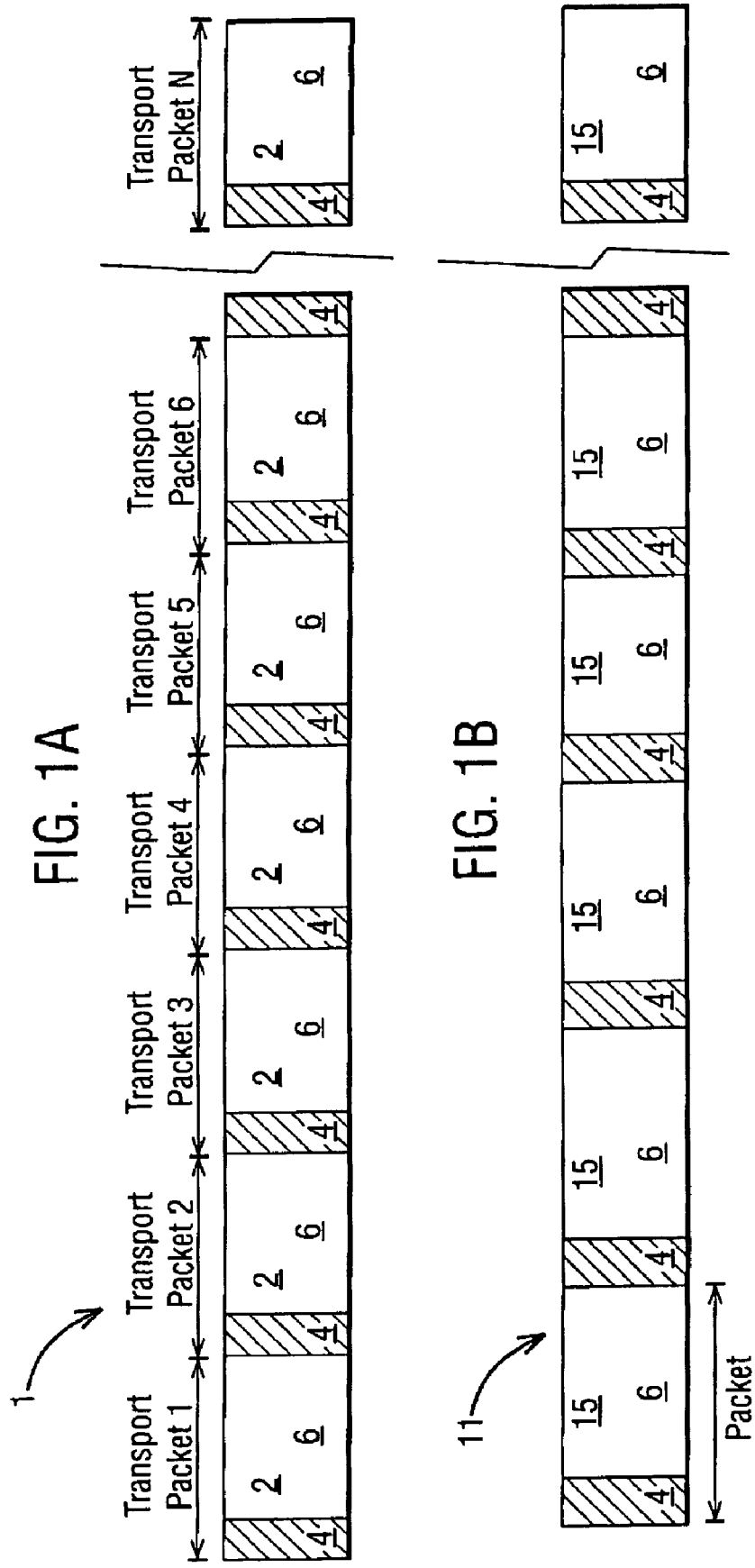
FIG. 1A illustrates a portion of a transport stream.
FIG. 1B illustrates a portion of a packet stream.

In the following description the present invention is described with reference to an exemplary embodiment in which an MPEG-2 transport packet stream, or other type of packet stream, is demultiplexed in a programmable transport interface of a receiver in a digital set top box. It will be apparent, however, that the present invention is not limited to such an application and does in fact have broader applicability to other types of digital data and other types of application for example ATM address filtering, Ethernet address filtering or the like. The present invention is particularly effective where packet streams are received from more than one source. Rather than a programmable transport interface, other circuitry may be used to demultiplex the packet stream, for example a fix hardware engine. Alternatively, the present invention is applicable where any circuitry may need to know the source of a packet stream, for example in order to distinguish streams from each other.

Devices that comprise embodiments of the present invention can be incorporated into a multitude of hardware, for example set top boxes, digital video players, multimedia devices or mobile stations or devices. These devices may include MPEG decoders. Set top boxes can include any device associated with a display, and may, for example, be network capable, low cost, internet protocol (IP) boxes and may incorporate digital video recording (DVR) functionality. Digital video players may be digital versatile disk (DVD) players or recorders. The multimedia devices or systems may be portable, video hand held devices with a USB, firewire or alternative interface, and may include MP3 playback. Mobile devices or stations may be digital video broadcast handheld (DVB-H) capable devices, which may included telephone functions and also include MP3 players.

FIG. 1A illustrates a portion of a transport stream 1 which is composed of a series of n transport packets 2. In this example the transport stream is in the format of an MPEG-2 transport stream. Such a transport stream may for example be received by a set top box via a satellite, cable, or terrestrial signal receiver, or via an interface to a network. Each transport packet 2 comprises a transport packet header 4 and a transport packet payload 6. The transport stream is a bit stream which carries in the transport packet payloads 6 information for recreating, for example, a number of different programs.

The transport stream is formed by source encoding the television programs. The transport stream is then typically channel encoded for transmission (by satellite, cable, via a network interface or other means) and channel decoded on its reception to reproduce the transport stream. The transport stream is then source decoded to recreate a selected one of the different television programs.

FIG. 1B illustrates a portion of a software packet stream 11. The term software stream is used throughout this application to distinguish a packet stream received from a memory, rather than from a satellite/cable receiver, however the software stream may be identical to the transport stream shown in FIG. 1A. A Software packet stream may originate, for example, from a flash memory or a hard disk drive, and be sent to the demultiplexing/decoding circuitry by a direct memory access unit as will be described in more detail hereinafter. Each software packet 15, like transport packets, also contains a packet header 4 and a payload 6, however the packet headers 4 may need to be added by a direct memory access unit if the data is not already in this format. While the software packet stream 11 may not be in the format of a transport stream, for example, it may have variable length packets, in other respects it is the same and may be treated in the same way. The term packet stream will be used throughout to mean a transport stream 1 and/or a software stream 15.

Each particular television program received as a packet stream requires three types of information for its recreation. The three types are audio information, video information, private data information and tables of program information which are associated with the audio and video information and provide control information. Private data could be for example security information or software update information for updating the software in a set top box.

Each transport packet 2 is preferably associated with a particular program, a particular source encoding time and a particular one of the information types. The individual transport packets are time division multiplexed to form the transport stream and allow the real-time recreation of any one of the different programs from the transport stream. To recreate a program the transport stream is sequentially demultiplexed to recover only the transport payloads 6 of audio or video information, private data and tables of program information which are associated with the selected program. The recovered payloads are then decoded and used to recreate the program. The software packet stream 11 is also demultiplexed to recover the payloads 6 of audio, video and private information and tables of program information, which may be decoded to recreate the program. The term program is used to cover television programs, films, audio recordings, video recordings or the like.

Vocabulary

According to the MPEG-2 digital video broadcast (DVB) standard, each of the transport packets 2 is 188 bytes long and the standard transport packet header 4 is four bytes long (however the header is expandable up to the whole packet length). The transport packet payload 6 contains either audio, video or private data information or sections. The sections are parts of tables. The audio and video information and the sections in the payloads 6 are packetized and encoded in accordance with MPEG-2 DVB compression standard. Data packets 15 of software packet stream 11 may also be encoded according to the MPEG-2 standard, however the data may also be packetized in different lengths, with a greater or fewer number of bytes in the header 4 or payload 6.

As will now be described, in embodiments of the present invention, the system is arranged not only to receive MPEG data in the form of packet streams from a satellite or cable link, the system is also able to receive software packet streams originating from data stored on a hard disk, a floppy disk or any other suitable source in local memory within the receiver, or from a remote station via a network interface.

Figure 2:
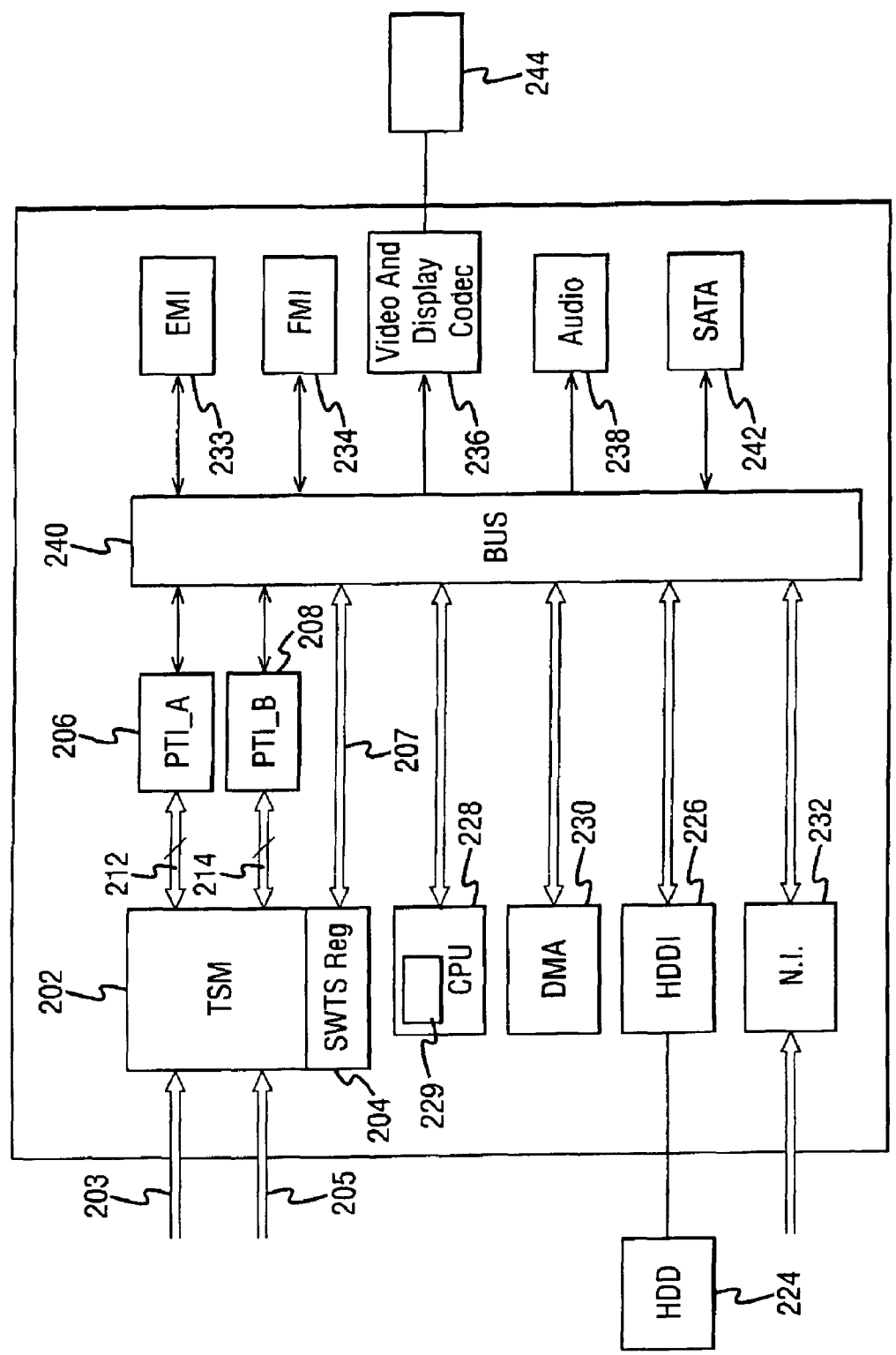
FIG. 2 illustrates an embodiment of the receiver according to the present invention.

Reference will now be made to FIG. 2 which shows in schematic form a system embodying the present invention. Transport streams 203 and 205 from a cable or satellite link are input to a transport stream merger TSM 202. Although this is not shown, a further link to receive a terrestrial signal could be provided. The TSM 202 has a software register 204 for receiving software packet streams on line 207. The function of the TSM 202 is to route packet streams from a variety of packet stream sources to a variety of packet stream targets in the form of programmable transport interfaces. The TSM 202 has two outputs on lines 212 and 214 to respective programmable transport interfaces 206 and 208. The TSM 202, the software register 204 and the programmable transport interfaces will be described in more detail hereinafter.

The system has a bus 240 which provides interconnections between elements of the system which will now be described.

A hard disk drive 224 is provided. Programs which are stored on the hard disk drive may be replayed via the software register 204 of the TSM 202. The hard disk drive 224 is arranged to interface with the other elements of system via a hard disk drive interface 226.

A CPU 228 is also provided. This CPU 228 may alternatively or additionally be arranged to store programs which can be replayed via the software register 204. The CPU 228 has a SRAM 229 which stores the programs to be replayed.

A DMA direct memory access unit 230 is provided. The DMA unit 230 can be configured to read blocks of data from one address and write them to another, for example from the hard disk to the TSM 202 and in particular its software register. This can be done with little intervention from the CPU. In particular the CPU just needs to program the DMA.

A network interface 232 is also provided. The network interface 232 provides a connection to one or more networks external to the system, including the internet and the worldwide web. Packet streams may be transmitted to the TSM from remote stations (not shown) via the network interface 232. Programs may also be downloaded from remote stations connected to the internet, and stored on hard disk 224 to be replayed later.

The system includes output hardware elements for viewing programs. A video and display CODEC coder-decoder unit 236 provides an output to a display device 244 which could be a television or display monitor. The type of connection to the display 244 can be any of a number of connections including a SCART connection, S-video connection or RF connection. An audio unit 238 is also provided for outputting sound to an external amplifier or speaker system, and can support stereo or surround sound formats.

An EMI external memory interface 233 provides an interface for connecting to external memory (not shown), and an FMI flash memory interface 234 provides an interface for connecting to flash memory (also not shown). These memories may be internal or external to the system. A SATA serial advanced technology attachment unit 242 provides a serial interconnection to a hard disk, digital versatile disk, compact disk or the like. These memory resources may be used to store program data from programmable transport interfaces 206 or 208, or other data for use in encoding or decoding the data for instance.

The programmable transport interfaces 206 and 208, DMA 230, CPU 228, network interface 232, hard disk drive interface 226, EMI 233, FMI 234, video and display CODEC 236, audio unit 238 and SATA unit 242 are all connected to bus 240 which allows these elements to communicate with each other.

Figure 3:
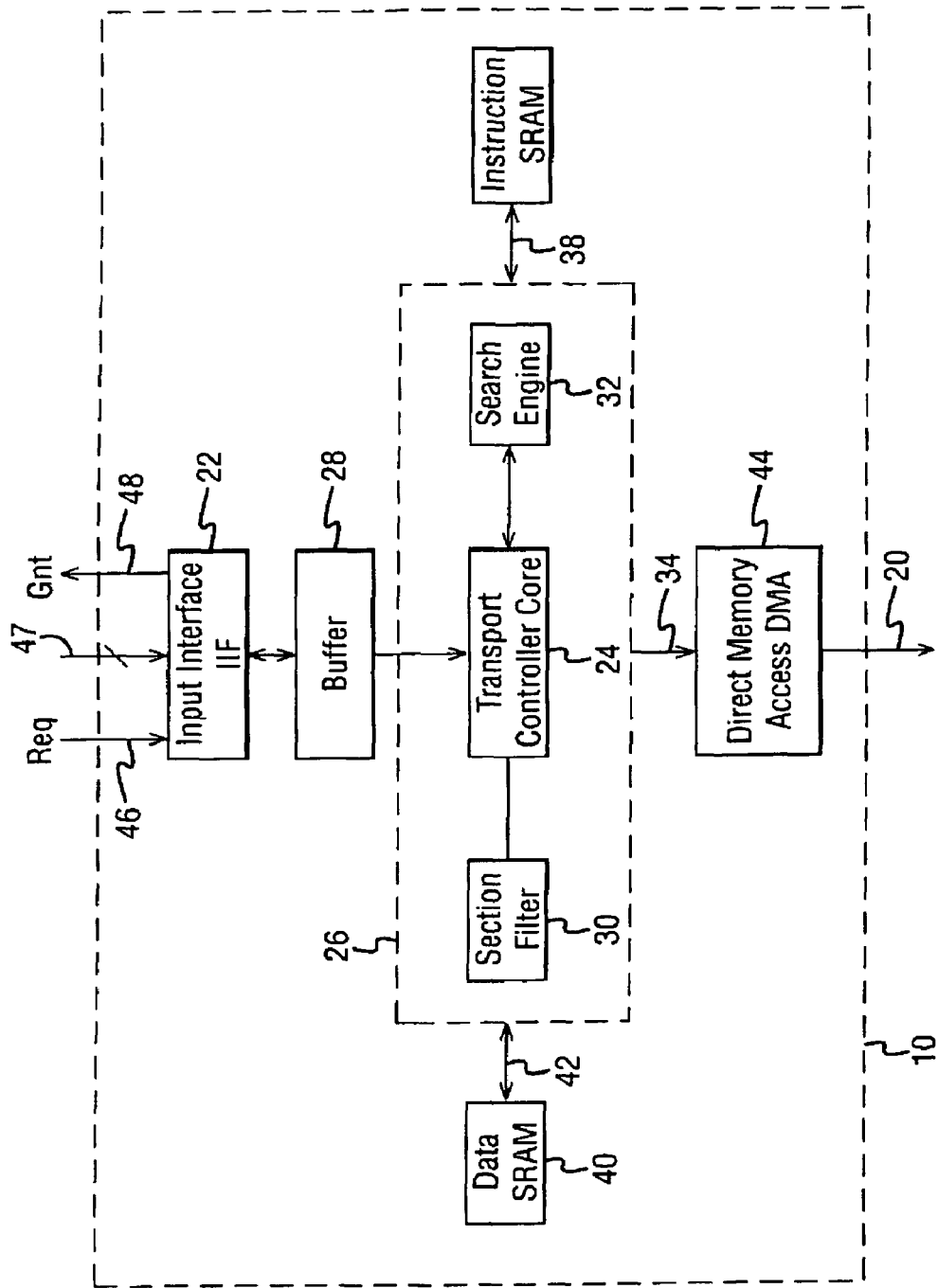
FIG. 3 illustrates in block schematic form a programmable transport interface.

One of the two programmable transport interfaces of FIG. 2 is shown in more detail in FIG. 3 and is used to process a packet stream and produce a data output stream suitable for reconstitution as a television program after MPEG-2 decoding by MPEG-2 decoders (not shown). The programmable transport interface 10 is included in a receiver which receives the transport stream 1, or software stream 11 and it may process one or multiple packet streams at the same time.

Figures 4, 7:
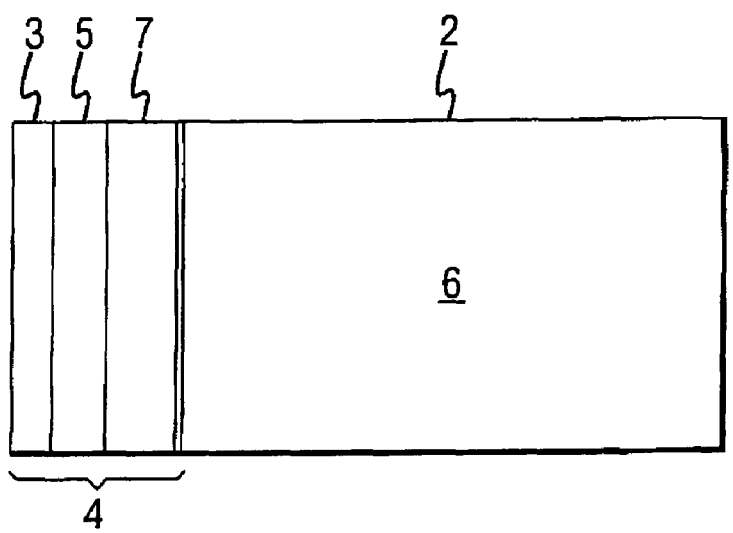
FIG. 4 illustrates a transport or data packet.
FIG. 7 shows a table showing tag values and register values stored in a tag register.

A transport packet is shown in more detail in FIG. 4. The transport packet header 4 contains a synchronization byte 3 which identifies the beginning of each transport packet 2. The transport packet header 4 also contains a packet identifier (PID) 7 which identifies the information type and the program associated with the transport packet payload 6. The transport packet 2 also contains information identifying the source encoding time of the transport packet. A tag 5 is also included in the transport packet header 4, described in more detail herein after. The transport packet header 4, including the synchronization byte 3, tag 5 and the PID 7, is not scrambled. The transport packet payloads 6 may be scrambled. Data packets 15 of the software packet stream 11 (not shown in detail) also include PID 7, and tag 5, and may also include a synchronization byte 3.

The programmable transport interface (PTI) 10 performs functions such as disregarding packets which are not required (i.e. if they do not relate to a selected program), descrambling packets, and demultiplexing the packet stream to produce a data output stream. Information relating to a packet stream (described in more detail herein after) is stored in SDRAM within the PTI 10, and is used in performing these functions. In past systems packets are selected and processed using the information selected from the SDRAM on the basis of the PID 7 in each packet. However, where packet streams originate from multiple sources, from both memory and transmitted cable and satellite signals, the PID value alone is not sufficient for the selection and processing of packets.

Embodiments of the present invention provide a tag 5 in the header 4 of each packet 2 or 15. This tag indicates the origin of the transport or software packet. That is to say it is indicative, in the case of a packet received in a software stream, of an address, known by the TSM 202, from which the packet was sent. In the case of packets received in a transport stream transmitted by cable or satellite, the tag 5 indicates the external port of the TSM 202 which received the transport stream.

According the present embodiment, the tag 5 comprises one byte of data; however in other embodiments it could comprise only a few bits of data, or more than one byte. Transport or software packets are tagged by the TSM 202, as described later herein. The PTI 10, which selects and processes packets using this tag 5, will now be described.

Referring again to FIG. 3, the PTI 10 performs the following functions:

1. Using the synchronization byte to identify the start of the transport or software packet.
2. Using the tag to identify the origin of the data packet;
3. Using the packet identification (PID) to identify, amongst other functions, the type of information contained in the packet (i.e. audio or video information or sections) and the program it represents;
4. Descrambling the packet payload 6; and
5. Demultiplexing the transport stream 1 or software stream 11 to produce a data output stream 20.

The data output stream 20 comprises a stream of audio information associated with the selected program, a stream of video information associated with the selected program or tables of program information associated with the selected program. The PTI outputs the streams to the necessary MPEG-2 decoder to reproduce the selected program, or to memory via the TSM 202 for decoding later.

The programmable transport interface 10 comprises an input interface. The input interface 22 receives software or transport packets from the TSM 202 and implements a handshake protocol with the TSM 202 in order to ensure that packets of the packet stream are transmitted on data line 47 without error. In the present embodiment an RG (Request/Grant) protocol is used, however it will be apparent to those skilled in the art that any suitable handshake protocol could be used, or none at all. As shown in FIG. 3, a data line 47, a request signal on line 46 and a grant signal on line 48 are provided between the input interface 22 of the PTI 10 and the TSM 202. According to one embodiment, the TSM 202 may request communication with one of the PTI 10, when for example a transport packet is ready, by asserting the request signal on line 46 (e.g. sending a high signal). If the input interface 22 is ready to accept the packet stream, it responds by asserting the grant signal 48. Once the packet has been sent on data line 47, the TSM 202 changes the request signal 46 to low, and in response the input interface 22 changes the grant signal 48 to low. Optionally, a further 'valid' signal may be provided (not shown in the figures) between the TSM 202 and the input interface. The valid signal indicates when the transport stream signal on data line 47 has been processed and there is free space in the fifo or memory subsystem of the PTI 10.

The input interface 22 identifies the synchronization byte of each packet which is used to synchronize the system clock and the packet stream. The input interface 22 is controlled by the transport core 24 of a transport controller 26 via input interface control signals from the transport controller core to the input interface. The control signals may include a descrambling control signal and output stream control signals.

The input interface 22 provides bits to the transport controller 26 via a buffer 28. The buffer 28 is used to temporarily store data from the input interface, when required. The input interface 22, under the control of the transport controller core 24 descrambles the payload 6 of selected packets and supplies selected descrambled payloads to the transport controller 26.

The transport controller 26 comprises a section filter 30 and search engine 32 in addition to the transport controller core 24. The transport controller 26 operates on the bits received from the input interface 22. In particular, the transport controller 26 receives from the input interface 22 the packet header 4 of the transport packet 2 or software packet 15 arriving at the input interface 22. The transport controller 26 uses the tag 5 and the packet identifier 7 in the packet header 4 to determine whether the packet now entering the input interface is associated with the selected program for the programmable transport interface 10. If it is not, the received packet is discarded. If it is, it controls the input interface 22 to descramble, if necessary, the packet payload 6 as described above, and to supply the packet payload 6 to the transport controller 26.

The transport controller 26 may pass a payload 6 associated with the audio or video information for the selected program straight to the transport controller output 34. If the payload relates to a section of a table the transport controller may further process the information before providing it at its output 34.

The transport controller core 24 of the transport controller 26 reads instruction sets from an instruction SRAM 36. The transport controller 26 is connected to the SRAM 36 by interconnect 38 and it reads its instructions via that interconnect. A system processor (not shown) may read and write to the instruction SRAM 36. However, the transport controller 26 has preferential access to the instruction SRAM 36 determined by an arbiter (not shown) which arbitrates between accesses by the transport controller 26 and the system processor.

The PTI 10 also comprises a data SRAM 40 which again can be accessed by the transport controller core 24. In particular, data is written to and read from the data SRAM 40 via interconnect 42. The search engine 32 in the transport controller 26 is also able to read data from the data SRAM 40. The search engine 32 searches the data SRAM 40 for the packet identifiers 7 associated with the packet source indicated by the tag 5 in the incoming packet header 4. Note that in the present embodiment the tag value only exists as far as this stage, and it may now be deleted from the packet header. Optionally in alternative embodiments the tag 5 may be left in the packet header and provided to compatible devices/systems capable of reading it to perform dejittering functions off-chip or in other areas within the device. If the packet is not to be discarded, then the PID for a packet from that source will have been stored in the data SRAM and is located by the search engine 32 of the transport controller 24. Associated with each packet identifier 7 and tag 5 in the data SRAM 40 is a plurality of pointers, which point to other addresses in the data SRAM where other information associated with the incoming transport is stored.

The search engine retrieves the pointer stored with a particular packet identifier for a particular packet source but used by the transport controller core 24. The transport controller core 24 then uses the pointers to access all the information it needs to process the payload of the incoming packet. The pointers may, for example, point to descrambling keys for use by the input interface 22, point to addresses for use by a direct memory access controller 44, identify whether the payload is video or audio information or sections, or identify whether the payload is special data to be output on an alternative output etc. Thus, the information obtained from the data SRAM 40 enables the transport controller to control the PTI 10.

The transport controller 26 produces the transport controller output 34 which is supplied to a multi channel direct memory access controller 44. The multi channel direct memory access controller 44 supplies the data output stream 20, indirectly, to the MPEG decoders (not shown).

Figure 5A:
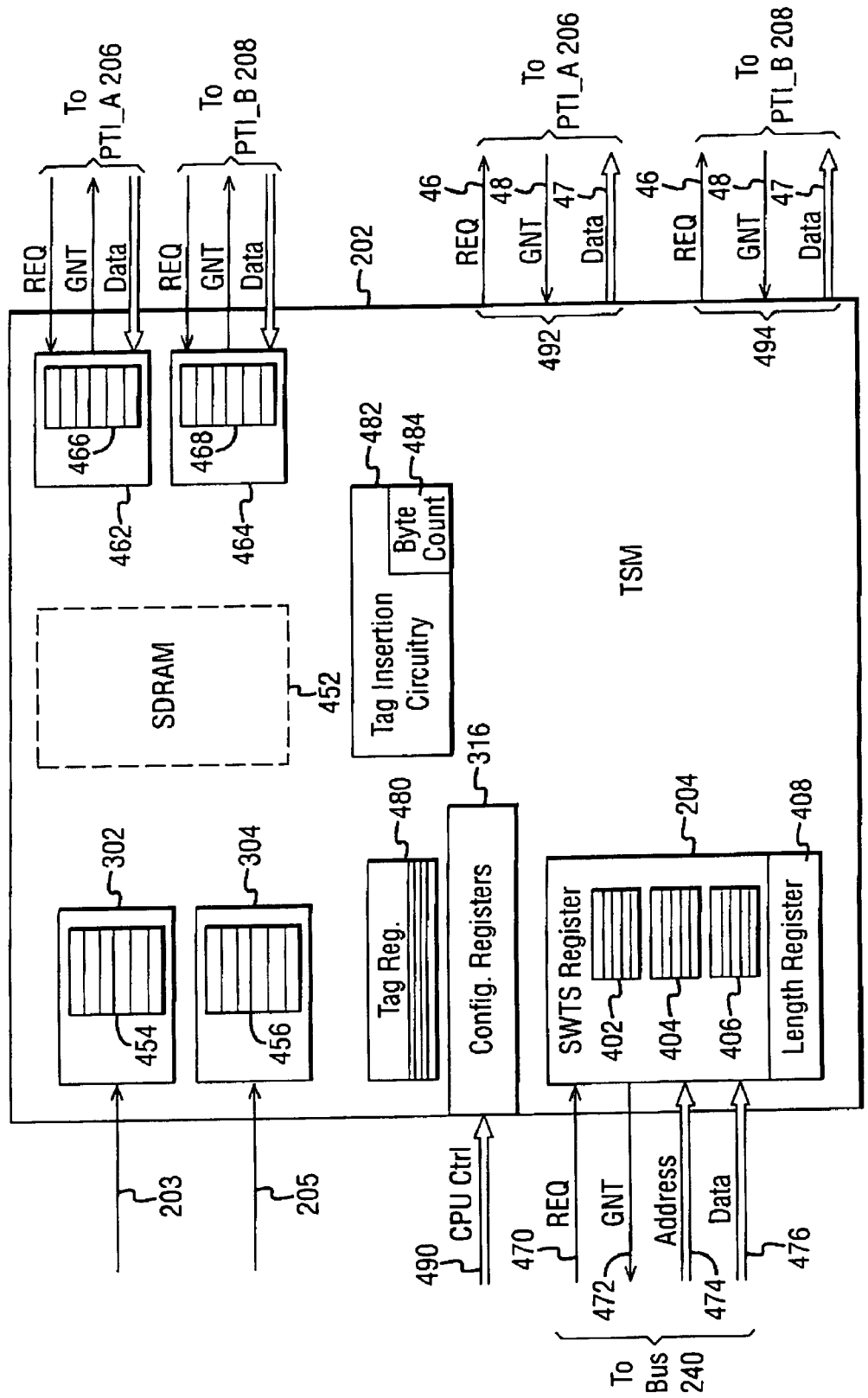
FIG. 5A shows a transport stream merger according to a first embodiment of the present invention.

Reference will now be made to FIG. 5A which shows the TSM transport stream merger 202 of FIG. 2 in more detail. The TSM 202 has two transport stream interfaces 302 and 304 through which external transport streams can be brought in on lines 203 and 205 respectively. The external transport streams may be from satellite or cable links, or received from digital broadcasters. The function of the transport stream interfaces 302 and 304 is to provide an interface between the external transport streams 203, 205 and the rest of the transport stream merger 202. The interfaces synchronize the transport stream to the system clock and convert where appropriate an external serial stream into a byte wide parallel stream. In an alternative embodiment the external stream may already be in a parallel mode in which case the interfaces 302, 304 would not need to perform serial to parallel conversion, but would still perform synchronization. Each interface 302, 304 includes an input buffer 454, 456 which are FIFO first-in-first-out buffers capable of storing a number of bytes, for example 256 bytes of received data from the external source. The size of these buffers will be determined based on the size of the received packets, the bit rate of the received stream, and the rate at which the buffer may be emptied. The size of these buffers is programmable by CPU 228, such that if overflow occurs more memory may be allocated, as explained in more detail below. External transport streams 203 and 205 may be received at interfaces 302 and 304 at different rates. When a complete packet has been received, for example a transport packet with four bytes of header data and 184 bytes of payload data, it may be output from the transport interface to one of the outputs 492 and 494. Additional functionality within the interfaces 302, 304 enables an asynchronous or synchronous (to the transport stream byte clock) packet clock from an external transport source to be detected. The interfaces are responsible for converting the streams to the required bus protocol of the system if required, however according to preferred embodiments of the present invention the protocol used before and after interfaces 302, 304 is the same, i.e. the Digital Video Broadcasting Transport Stream (DVB-TS) protocol, and therefore no conversion is required.

A software register 204 is provided in the TSM 202 which allows the input of the software packet streams using direct memory access unit 230, or from any of the elements 226 to 232, via bus 240 (FIG. 2). A single software register port is provided for all software transport streams, that is to say all a single port is provided for all those streams not received from satellite or cable sources. In one modification, a plurality of ports which are shared may be provided. The software register 204 also allows the input of transport streams from an external network via the network interface 232, or from SRAM 229 associated with the CPU 228. In other words the software register 204 allows the playback of material which is already stored in a memory or the like. This memory can be any suitable memory as discussed above and may, for example, be a memory of the CPU 228, a hard disk drive 224, a SDRAM, or removable media such as a floppy disk, CDROM, DVD or the like (not shown) or alternatively the memory of a remote device accessible via the network interface 232. The software register 204 is a software writable transport stream register. This register can be used to copy one or more packet streams from memory and stream them to either of the programmable transport interfaces 206 or 208. Buffers 402 to 406 are provided, allowing up to three software packet streams to be received via lines 470 to 476, each stream being designated a particular buffer. In other embodiments more or less buffers may be provided. The register is described in more detail herein after.

The TSM 202 has output lines 492 and 494 to PTI 206 and 208 respectively. Each of the output lines 492 and 494 to respective PTI comprise a data line 47 and request and grant lines 46 and 48, which are also shown in FIG. 3, and a handshake protocol is implemented as described in relation to FIG. 3.

The TSM 202 also includes ports 462 and 464 providing connection to the two programmable transport interfaces 206 and 208 respectively, and allowing output data streams to be received from each of the PTI. In preferred embodiments the ports implement a handshake protocol when communicating with the programmable transport interfaces 206 and 208, as described above in relation to FIG. 3. The ports include buffers 466 and 468 respectively, which are each, for example, 256 bytes in size. Output data streams received via these ports may be stored in memory via EMI 233, FMI 234, Serial ATA 242, HDD 224 or other external memory via network interface 232.

SDRAM 452 in the TSM 202 provides memory resources for use by the input ports and also the software transport stream register 204. Preferably the TSM 202 implements a system of virtual buffers, allowing the physical memory to be efficiently allocated to the elements that require use of the memory for the buffers and registers described above.

CPU 228 may access and control TSM 202 via control bus 490 and configuration registers 316, as will be described in more detail hereinafter.

A programmable tag register 480 is also provided in the TSM 202, the operation of which will now be described with reference to FIG. 7. The programmable tag register 480 is used for determining the tag byte that is to be inserted into the header of each transport packet received by the TSM 202. In alternative embodiments the tag value could be provided by hardware, however using a programmable register means that the system is adaptable. The tag byte value is dependent on whether the transport stream is received by one of the two external ports 302 or 304, or other external ports if these are provided, or if the stream is a software packet stream received by software register 204. In one embodiment of the present invention the programmable tag register 480 stores a value associated with each external transport stream as shown in the second column of the table in FIG. 7. A first external stream received at port 302 of the TSM 202 is associated with a value 0x00 (hexadecimal). A second external stream received at port 304 of the TSM 202 is associated with a value 0x01 in the register, and further external streams (not included in the present embodiment) can be assigned values up to 0x0F. The value held for all of the software packet streams is 0x10.

The tag inserted into the header of each packet for the external streams will be simply the register value associated with that stream as explained above. The value of the tag byte in the case of the software packet streams is the register value added to a plurality of the LSB least significant bits of the address from which stream originates. This address is received by the TSM 202 on line 474 from the bus 240. For example, as shown in FIG. 7, if the address from which the transport stream is sent ends with 0x00, then the tag byte inserted in the packet headers of this stream will be 0x10. If the value is 0x01, then the tag byte will be 0x11. If there are 'n' software streams, then the nth stream will have a tag byte of 0xFF. Thus in this embodiment, tag values between 0 and 0x0F are reserved for external streams by offsetting the software stream tags by 0x10.

Tag insertion circuitry 482 is also provided within TSM 202 for inserting the tag into the transport packets. Tag insertion circuitry 482 includes a byte counter 484 which locates the position within the packet for inserting the tag. In the case of software transport streams received by the software register 204, the packets may be of varying sizes, and data relating to their sizes is stored in a length register 408. Values in the length register are programmable by the CPU 228. This data may be used by the tag insertion circuitry for locating the position for inserting the tag in the case of software transport packets.

Insertion of a tag 5 by the tag insertion circuitry 482 will now be described. In embodiments of the present invention, a tag is inserted at the time when transport stream data is received and stored in one of the buffers 454, 456 associated with the external transport streams, or one of the buffers 402, 404, 406 associated with the software transport streams. Tag insertion in the case of external transport streams will be described first.

When a full packet has been received by either input buffer 454 or 456, the tag insertion circuitry uses the data associated with the input port stored in the tag register 480 to determine the value of the tag to be inserted. This value may then be inserted directly into the required position in the packet, the position being located by the byte counter 484. As described in relation to FIG. 4, preferably the tag is inserted into the packet header 6, however alternatively the tag could be inserted into the payload 6 of the packet. In yet a further embodiment, the tag 5 could be stored in the input buffer memory 454 separately from the packet. The packet is then ready to be sent to either of the PTI 206 or 208, on communication lines 492 or 494 respectively. The tag 5 will either be sent in the packet header, or in alternative embodiments the tag may be sent in the packet payload or directly before or after the packet.

In the case of software streams, when a complete packet has been received in any of the input buffers 402 to 406, the address received on line 474 associated with that packet is used by the tag insertion circuitry 482 to determine the value of the tag for insertion into the packet. In the preferred embodiment as described in relation to FIG. 7 a number of the least significant bits of the address are added to an offset to determine the value of the tag. As described above in relation to the tag insertion for external streams, the tag 5 may be inserted into the header 4 or the payload 6 of the packet, or alternatively inserted into the memory separately from the packet. The packet is then ready to be sent to one of the PTI 206 or 208, and the tag 5 may be send before, within or after the packet.

Figure 5B:
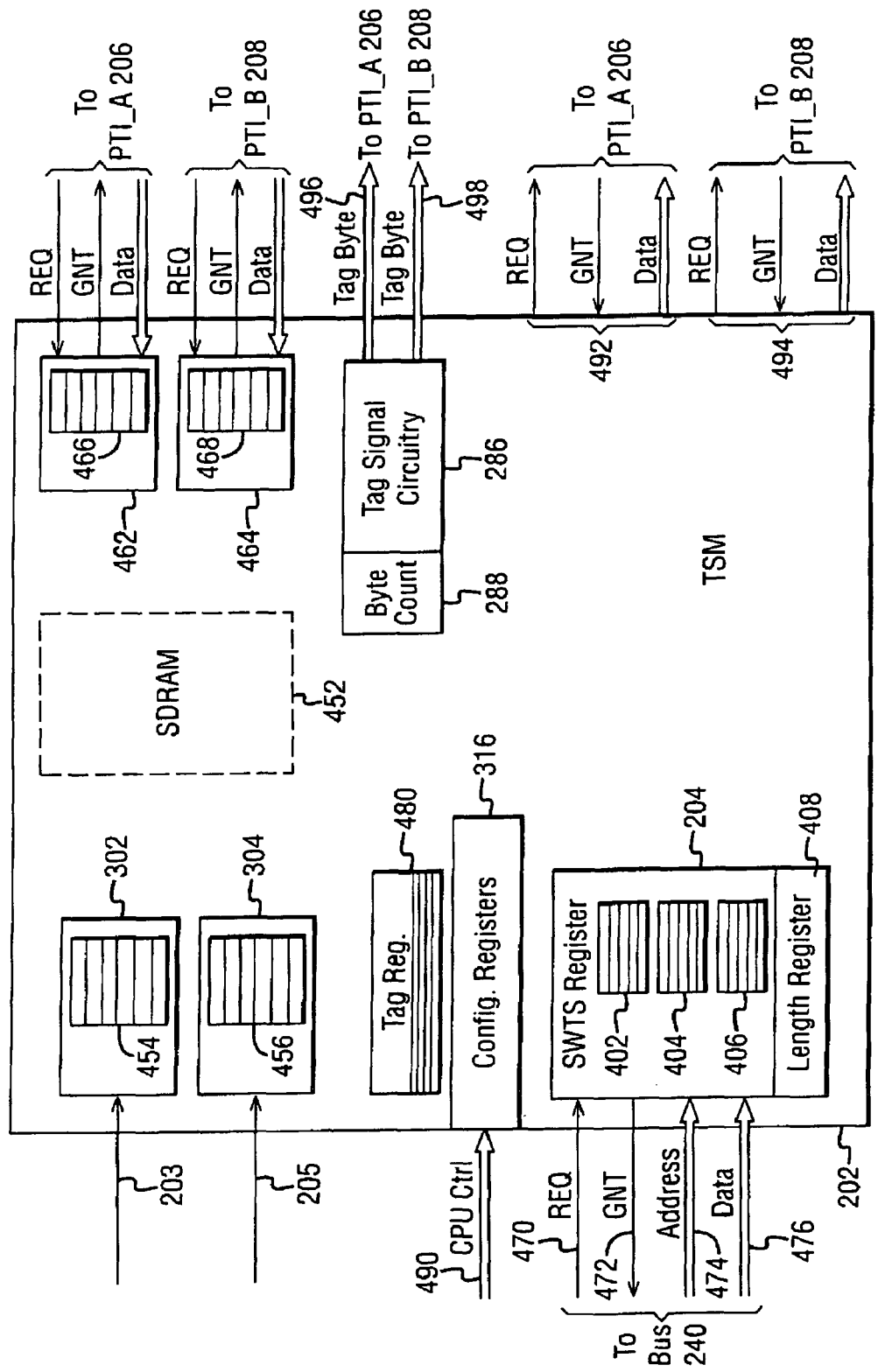
FIG. 5B shows a transport stream merger according to a second embodiment of the present invention.

FIG. 5B shows a second embodiment of the present invention. The only difference between the circuitry in FIGS. 5A and 5B is that tag signal circuitry 286 and byte counter 288 are provided to replace tag insertion circuitry 482 and byte count 484. Also, signals 496 and 498 are provided to PTI 206 and 208 respectively from the tag signal circuitry 286. All other components in FIG. 5B are the same as those components of FIG. 5A with the same references, and will not be described again.

Whereas in the first embodiment of the present invention shown on FIG. 5A the tag is inserted into the packet, or provided before or after the packet on data line 47, according to the second embodiment shown in FIG. 5B the tag 5 is provided on a separate line 496 or 498 from the packet, which is sent on lines 492 or 494. This is known as off-band signalization. Operation of the tag signal circuitry 286 of FIG. 5B will now be described.

When a full packet has been received into any of the input buffers 454, 456 or 402 to 406, (this may be determined by byte counter 288) the tag signal circuitry 286 determines the value of the tag 5 to be inserted in the same way as the tag insertion circuitry 482, using values stored in the tag register 480, and in the case of software packets, the address on line 474. Then, rather than inserting the tag into the buffer, the tag signal circuitry waits until the packet is ready to be sent to one of the PTI 206 or 208. At the same time the packet is sent on lines 492 or 494, the tag byte 5 is also sent on lines 496 or 498, the packet arriving at the PTI at the same time as the tag byte. The PTI will use the tag 5 in the same way as if it were provided within the packet header.

The software register 204 of FIGS. 5A and 5B is shown in more detail in FIG. 6 which will now be described. Data bytes or words are first written to a data register 400 by a DMA or CPU or the like. Interface circuitry 410 provides an interface allowing communication with the bus 240 (shown in FIG. 2) in a standard request grant RG protocol using the four signals request 470, grant 472, address 474 and data 476. The request signal on line 470 is asserted by the CPU or DMA or other device when access to the software register is required. The grant signal on line 472 is always asserted by default, unless there are less than a certain number of byte locations available in one of the first-in-first-out FIFO memory 402, 404, 406, as described in more detail below. Software packet stream data is received on line 476, and this data may represent one or more software transport/packet streams. Address information relating to the address from which the packet stream currently being received has originated is received on line 474.

In this embodiment the data register has 32 bits. The written data is then forwarded to one of the three first-in-first-out FIFO buffers 402 to 406, each of 256 bytes which are used to buffer the data. The size of each buffer is programmable by CPU 228 as described in more detail herein after. Each software stream is sent to a different FIFO buffer. In the present embodiment three such buffers are provided, however this is software configurable, and more or less buffers could be provided depending on the available memory resources. Providing more FIFO buffers would allow a greater number of software streams to be received simultaneously. The FIFO buffers 402 to 406 convert the data into byte wide transport streams. When there is room for a given minimum number of bytes in one of the FIFO buffers, the grant signal on line 472 remains high allowing the CPU or DMA to read more data to the buffer. If less than a minimum number of empty bytes are left in one of the FIFO, then the grant signal on line 472 goes low, telling the CPU or DMA that the buffer is nearly full. Data is then emptied from the buffer before more data is received. As shown in FIG. 6, a full signal 412 is provided from the FIFO buffers 402, 404 and 406, determining when the grant signal should be asserted. The minimum amount of empty space required in a FIFO buffer for data to continue to be read to it is determined by the burst size of the received data, but could be for example 64 bytes.

In practice the size of the FIFO buffers is programmed by the CPU. If required more of less memory may be allocated to each the buffers, depending on the number buffers and streams being received, the bite rate of received streams, the size of the packets and the rate at which a stream may be processed. The value may be determined by the following equation:

$$Bs = Ps + \sum_{i=1}^{n} Ts_i \cdot \frac{Ps_i}{B_i}$$

Where Bs is the buffer size, Ps is the packet size of received packets, Ts is the bit rate of the incoming stream, B is the rate at which the stream may be processed, and n is the number of streams being received, which in the present embodiment is equal to the number of buffers. For example if first and second buffers are provided, each receiving a stream, then the size of the first buffer can be determined as follows. If the bit rate of the first stream is 160 Mb/s with packet sizes of 128 bytes, the bit rate of the second stream is 180 Mb/s with packet sizes of 64 bytes, and the bit rate that streams may be processed is 200 Mb/s, then the size of the first buffer would need to be at least the packet size of 128 bytes plus 102.4 bytes for the first stream (n=1) and 57.6 bytes for the second stream (n=2), giving a total of 288 bytes.

The software register 204 also includes a length register 408 which stores the packet lengths of packets in each of the received packet streams. The values in the length register 408 are programmed by the CPU, and are used to configure the device to the type of packets being received. The register may then be used by the byte counter 484 for locating where to insert the tag 5. This value is also used for determining when a whole packet has been received and may be outputted to one of the PTI.

The use of the software register 204 allows transport stream to be stored on the hard disk and then replayed allowing fast forward, rewind and similar functions. It also allows programmes to be viewed via the network interface 232, and internal back-buffering.

As soon as there is a certain amount of data in one of the FIFO buffers 402 to 406, the software register 204 will start outputting it to one of the programmable transport interfaces. A decision can be made, determined by the available resources of each programmable transport interface 206 or 208 as to which of these interfaces a particular stream will be sent.

The data may have any suitable format. In one embodiment of the present invention, the data output by the software register 204 will be little endian. This means that the least significant byte contains the byte which is first output by the software register 204.

Figure 8:
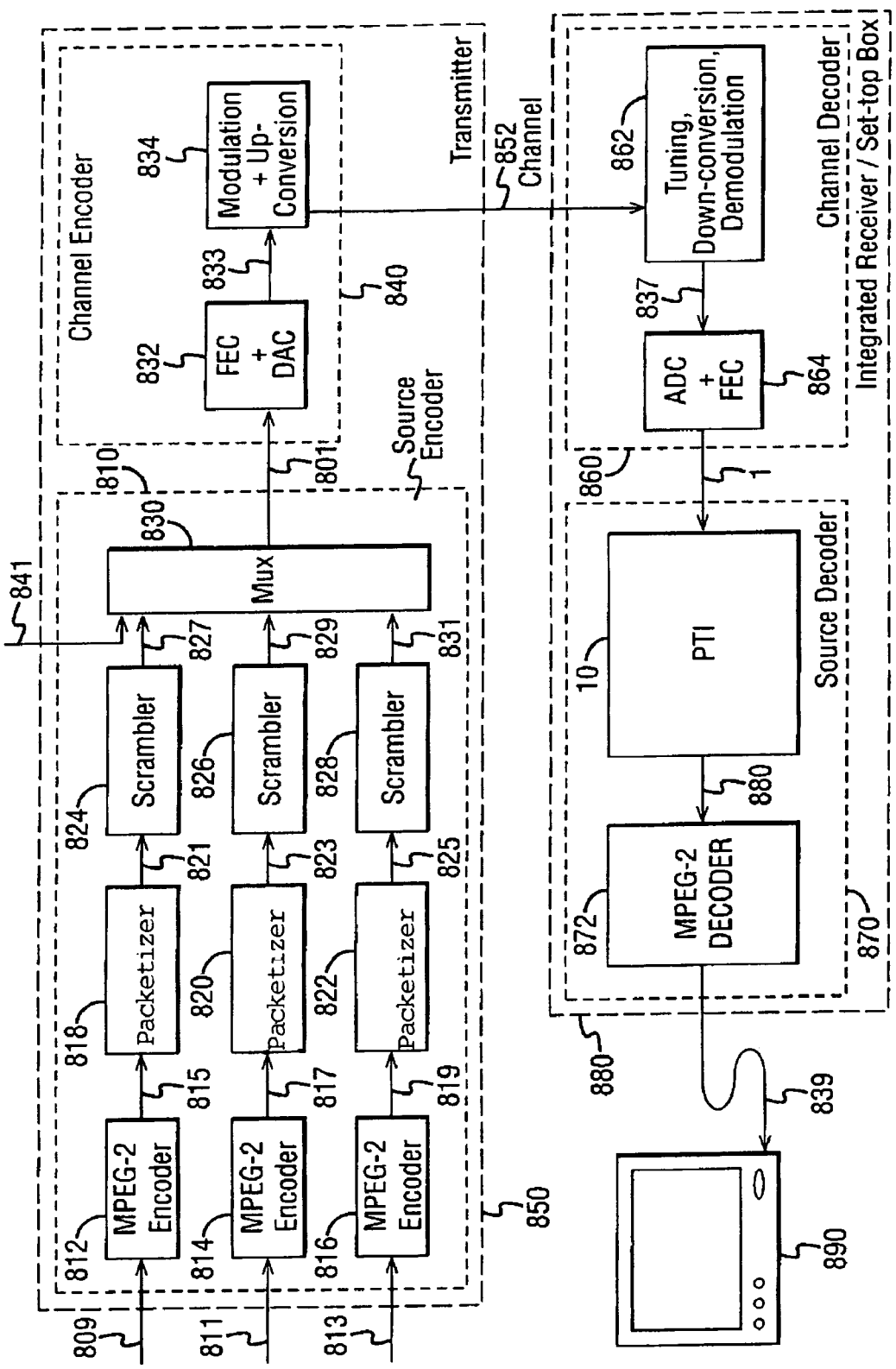
FIG. 8 shows a digital video broadcast system incorporating a programmable transport interface in which an embodiment of the present invention may be implemented.

FIG. 8 illustrates how digital signals 809, 811 and 813 can be transmitted via a cable, satellite or terrestrial channel 852 and be viewed on a display 890. The first, second and third signals 809, 811 and 813 each represent the audio and video signals necessary to recreate a program for input to a display. The digital signals 809, 811 and 813 are source encoded and channel encoded by a transmitter 850 to produce a modulated analog signal for transmission on the channel 852. An integrated receiver decoder (also known as a set top box 880) receives the modulated analog signal from the channel 852 and produces a video signal 839 which operates the display 890.

The operation of the transmitter 850 will now be explained. The transmitter includes a source encoder 810 and a channel encoder 840. The source encoder includes first, second and third MPEG 2 encoders 812, 814 and 816, first, second and third packetizers 818, 820 and 822, first, second and third scramblers 824, 826 and 828 and a multiplexer 830.

First, second and third MPEG-2 encoders respectively receive first 809, second 811 and third 813 signals and encode the signals to produce first, second and third elementary bit streams 815, 817 and 819. The first 818, second 820 and third 822 packetizers respectively receive first 815, second 817 and third 819 elementary bit streams and packetize the elementary bit streams to produce first, second and third packetized elementary bit streams (PES) 821, 823 and 825. The packetizing of an elementary bit stream includes creating series of packets which contain a packet head and a data portion, but which do not have any fixed length. The first, second and third scramblers respectively receive first, second and third packetized elementary bit streams and produce first, second and third scrambled packetized elementary bit streams. Each of the scramblers scrambles only the data portion of each packetized elementary bit stream it receives and does not scramble the packet header.

The multiplexer 830 receives as inputs packetized sections of tables on line 841 and the first, second and third scrambled PES 827, 829 and 831 and produces a transport stream from one of its inputs on line 801. The packetized sections with tables 841 contain information which allows the set top box 880 to effect source decoding and produce the video signals 839. The information is stored in a tabular form where each table contains a number of sections and each section is transmitted individually.

The multiplexer 830 produces the transport stream 801 such as that illustrated in FIG. 1. The transport stream includes a number of transport packets with each transport packet containing a transport header 4 and a transport packet payload 6. Transport packets have a fixed length. In the MPEG-2 digital video broadcast (DVB) standard the transport packet is 188 bytes in length. Transport packets are shorter in length than the packets in the packetized elementary stream. Consequently a packet from the first scrambled PES 827 will be spread over a number of transport packets and these transport packets will be multiplexed with the transport packets derived from the packetized sections in tables 841 and the second and third scrambled PES 829, 831. The transport stream is then supplied on line 801 to the channel encoder 840 to produce the modulated analog signal for transmission on the channel 852.

The channel encoder 840 includes a circuitry 832 for forward error correcting (FEC) the transport stream on line 801 and a digital to analog converter for converting the signal from the digital to analog domain to produce an analog signal 833. The analog signal 833 is modulated and up converted to a transmission frequency by the circuitry 834 to produce the modulated analog signal which is then transmitted into the channel 852.

The operation of the set top box 880 will now be described. The set top box includes the system of FIG. 2 but for the purposes of clarity not all of the elements of that figure are shown. The set top box 880 includes a channel decoder 860 and a source decoder 870. The channel decoder 860 receives a modulated analog signal on the channel 852 and produces the transport stream 1 which it supplies to the source decoder 870. The channel decoder 860 includes circuitry 862 for tuning to the modulated analog signal on the channel 852 and for down converting and demodulating the modulated analog signal on the channel 852 to produce an analog signal 837. The analog signal 837 is converted from analog to digital in an analog to digital converter and forward error corrected by the circuitry 864 to reproduce the transport stream 1.

The source decoder 870 receives the transport stream 1 and produces the video signal 839. The source decoder 870 includes the programmable transport interface 10 and MPEG-2 decoder 872. The PTI 10 (only one of which is shown for clarity) demultiplexes the transport stream 1, selects the transport packets 2 carrying information relating to a particular program, and descrambles the selected transport packet to produce a data output stream 880, which is in fact the packetized elementary bit stream associated with the selected program. This stream may be stored in memory (not shown in FIG. 8) for example flash memory via FMI 234 (FIG. 2). It should be appreciated that the transport stream may not have been received via a cable or satellite connection and may have been received by the software register 204. The MPEG-2 decoder 872 receives the data output stream 880 and produces the video signal 839 which is supplied to the display 890. The display 890 displays the selected program.

While the preferred embodiments of the present invention have included two programmable transport interfaces, alternative embodiments may include more or less than this number of interfaces. Some embodiments of the present invention may not receive transport streams from cable, satellite or the like and may only receive an input via the software register input. Alternatively, only external transport sources may be received. In either of these embodiments the packets of the transport stream may be tagged as described earlier. A plurality of software registers 204 may be provided in some embodiments of the present invention.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A system comprising:
    at least one transport stream interface for receiving a plurality of packet streams from a plurality of sources, each of the plurality of packet streams being received from a corresponding source of the plurality of sources, a first packet stream of the plurality of packet streams comprising a plurality of packets for providing audio, video, private data and/or associated information; and
    at least one output for sending at least one packet of said plurality of packets to circuitry arranged to provide an output stream, wherein:
    each packet in the plurality of packets is associated with one of a plurality of programs, each packet comprising a program identifier tag identifying the program associated with the packet;
    the system is arranged to provide a source identifier tag for the at least one packet, the source identifier tag being different from the program identifier tag and indicative of the source of the at least one packet;
    said at least one output sends said at least one packet to said circuitry via a first communication line;
    said system is arranged to provide the source identifier tag to said circuitry separately from said at least one packet, on a second communication line separate from said first communication line;
    the at least one transport stream interface comprises a software input port arranged to receive at least one of the plurality of packet streams from a memory; and
    the value of the source identifier tag provided for a first packet received by said software input port is determined by adding an offset to one or more bits of an address of the source of said first packet.

2. The system of claim 1, further comprising tag signal circuitry to provide the source identifier tag on the second communication line.

3. The system of claim 1, wherein said plurality of sources comprises at least one source selected from the group consisting of:
    a memory external to said system;
    a memory internal to said system;
    satellite signal receiving circuitry;
    cable signal receiving circuitry;
    terrestrial signal receiving circuitry;
    an external memory accessible via an external memory interface;
    a flash memory accessible via a flash memory interface;
    a flash memory internal to said system;
    a hard disk drive accessible via a hard disk drive interface;
    a memory accessible via a network interface; and
    a memory accessible via a direct memory access unit.

4. The system of claim 1, wherein said source identifier tag is determined based on an address of said source of the at least one packet.

5. The system of claim 1, wherein the at least one transport stream interface comprises an external input port arranged to receive at least one of the plurality of packet streams via satellite signal receiving circuitry.

6. The system of claim 1, wherein the at least one transport stream interface comprises an external input port arranged to receive at least one of the plurality of packet streams via cable signal receiving circuitry.

7. The system of claim 1, wherein said software input port comprises a software register.

8. The system of claim 7, wherein said software register comprises at least one buffer for storing packets from at least one packet stream.

9. The system of claim 1, wherein said circuitry is arranged to keep said at least one packet if said source identifier tag is of a first value and to discard said at least one packet if said source identifier tag is of a different value.

10. The system of claim 1, wherein said circuitry is arranged to locate information for use in processing said at least one packet based on said source identifier tag.

11. The system of claim 1, wherein said circuitry is arranged to provide an output stream such that said output stream is suitable for decoding.

12. The system of claim 1, wherein said system further comprises a source identifier tag register for use as a reference in determining the value of said source identifier tag.

13. The system of claim 12, wherein said source identifier tag register is programmable.

14. The system of claim 1, wherein the system comprises a plurality of transport stream interfaces, and wherein the value of the source identifier tag provided for the at least one packet is determined based on which of said plurality of transport stream interfaces receives said at least one packet.

15. The system of claim 1, wherein the value of the source identifier tag provided for a second packet received by said software input port is determined by one or more bits of an address of the source of the second packet.

16. The system of claim 15, wherein said one or more bits of said address are the least significant bits of said address.

17. The system of claim 1, wherein the value of said source identifier tag provided for at least one packet received by an external input port is less than said offset.

18. The system of claim 1, wherein at least one of said plurality of packet streams is a transport stream, the transport stream comprising transport packets.

19. An integrated circuit comprising the system of claim 1.

20. An integrated circuit as claimed in claim 19 incorporated in one of the following:
    a set top box;
    a digital video player;
    a multimedia device; and
    a mobile device.

21. The system of claim 1, wherein the system is arranged to send the at least one packet and provide the source identifier tag to the circuitry at the same time.

22. A set top box comprising a device, said device comprising:

at least one transport stream interface for receiving a plurality of packet streams from a plurality of sources, each of the plurality of packet streams being received from a corresponding source of the plurality of sources, a first packet stream of the plurality of packet streams comprising a plurality of packets for providing audio, video, private data and/or associated information; and at least one output for sending at least one packet of said plurality of packets to circuitry arranged to provide an output stream, wherein:

each packet in the plurality of packets is associated with one of a plurality of programs, each packet comprising a program identifier tag identifying the program associated with the packet;

the device is arranged to provide a source identifier tag for the at least one packet, the source identifier tag being different from the program identifier tag and indicative of the source of the at least one packet;

said at least one output sends said at least one packet to said circuitry via a first communication line;

said device is arranged to provide the source identifier tag to said circuitry separately from said at least one packet, on a second communication line separate from said first communication line;

the at least one transport stream interface comprises a software input port arranged to receive at least one of the plurality of packet streams from a memory; and the value of the source identifier tag provided for a first packet received by said software input port is determined by adding an offset to one or more bits of an address of the source of said first packet.

23. A mobile station comprising a device, said device comprising: at least one transport stream interface for receiving a plurality of packet streams from a plurality of sources, each of the plurality of packet streams being received from a corresponding source of the plurality of sources, a first packet stream of the plurality of packet streams comprising a plurality of packets for providing audio, video, private data and/or associated information; and at least one output for sending at least one packet of said plurality of packets to circuitry arranged to provide an output stream, wherein:

each packet in the plurality of packets is associated with one of a plurality of programs, each packet comprising a program identifier tag identifying the program associated with the packet;

the device is arranged to provide a source identifier tag for the at least one packet, the source identifier tag being different from the program identifier tag and indicative of the source of the at least one packet;

said at least one output sends said at least one packet to said circuitry via a first communication line;

said device is arranged to provide the source identifier tag to said circuitry separately from said at least one packet, on a second communication line separate from said first communication line;

the at least one transport stream interface comprises a software input port arranged to receive at least one of the plurality of packet streams from a memory; and the value of the source identifier tag provided for a first packet received by said software input port is determined by adding an offset to one or more bits of an address of the source of said first packet.

24. A digital video player comprising a device, said device comprising:

at least one transport stream interface for receiving a plurality of packet streams from a plurality of sources, each of the plurality of packet streams being received from a corresponding source of the plurality of sources, a first packet stream of the plurality of packet streams comprising a plurality of packets for providing audio, video, private data and/or associated information; and at least one output for sending at least one packet of said plurality of packets to circuitry arranged to provide an output stream, wherein:

each packet in the plurality of packets is associated with one of a plurality of programs, each packet comprising a program identifier tag identifying the program associated with the packet;

the device is arranged to provide a source identifier tag for the at least one packet, the source identifier tag being different from the program identifier tag and indicative of the source of the at least one packet;

said at least one output sends said at least one packet to said circuitry via a first communication line;

said device is arranged to provide the source identifier tag to said circuitry separately from said at least one packet, on a second communication line separate from said first communication line;

the at least one transport stream interface comprises a software input port arranged to receive at least one of the plurality of packet streams from a memory; and the value of the source identifier tag provided for a first packet received by said software input port is determined by adding an offset to one or more bits of an address of the source of said first packet.

25. A multimedia system comprising a device, said device comprising:

at least one transport stream interface for receiving a plurality of packet streams from a plurality of sources, each of the plurality of packet streams being received from a corresponding source of the plurality of sources, a first packet stream of the plurality of packet streams comprising a plurality of packets for providing audio, video, private data and/or associated information; and at least one output for sending at least one packet of said plurality of packets to circuitry arranged to provide an output stream, wherein:

each packet in the plurality of packets is associated with one of a plurality of programs, each packet comprising a program identifier tag identifying the program associated with the packet;

the device is arranged to provide a source identifier tag for the at least one packet, the source identifier tag being different from the program identifier tag and indicative of the source of the at least one packet;

said at least one output sends said at least one packet to said circuitry via a first communication line;

said device is arranged to provide the source identifier tag to said circuitry separately from said at least one packet on a second communication line separate from said first communication line;

the at least one transport stream interface comprises a software input port arranged to receive at least one of the plurality of packet streams from a memory; and the value of the source identifier tag provided for a first packet received by said software input port is determined by adding an offset to one or more bits of an address of the source of said first packet.

26. A method of receiving a packet stream, the method comprising:

receiving, via at least one transport stream interface, a plurality of packet streams from a plurality of sources, each of the plurality of packet streams being received from a corresponding source of the plurality of sources, a first packet stream of the plurality of packet streams comprising a plurality of packets for providing audio, video, private data and/or associated information, wherein each packet in the plurality of packets is associated with one of a plurality of programs, each packet comprising a program identifier tag identifying the program associated with the packet;

providing, on a first communication line, a source identifier tag for at least one packet of the plurality of packets, the source identifier tag being different from the program identifier tag and indicative of the source of the at least one packet; and outputting, separately from said source identifier tag and via a second communication line, said at least one packet to circuitry arranged to provide an output stream, said second communication line being separate from said first communication line;

wherein the at least one transport stream interface comprises a software input port arranged to receive at least one of the plurality of packet streams from a memory, and wherein the value of the source identifier tag provided for a first packet received by said software input port is determined by adding an offset to one or more bits of an address of the source of said first packet.

27. The method of claim 26, wherein the source identifier tag is provided and the at least one packet is output to the circuitry at the same time.

* * * * *